Figure 1:
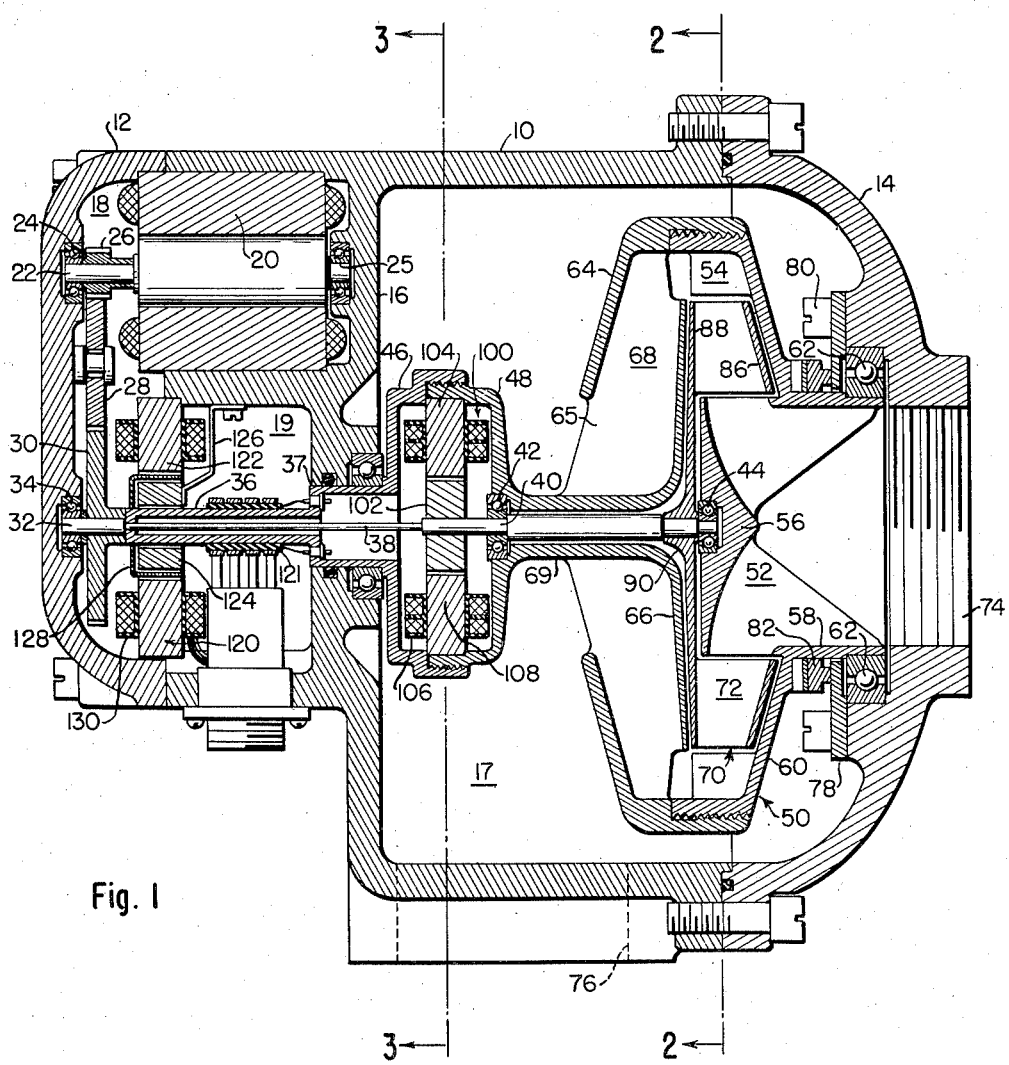

INVENTOR.
ROBY B. WHITE

April 29, 1958 R. B. WHITE 2,832,218
CORIOLIS MASS FLOWMETER
Filed July 9, 1954 2 Sheets-Sheet 2
Fig. 2
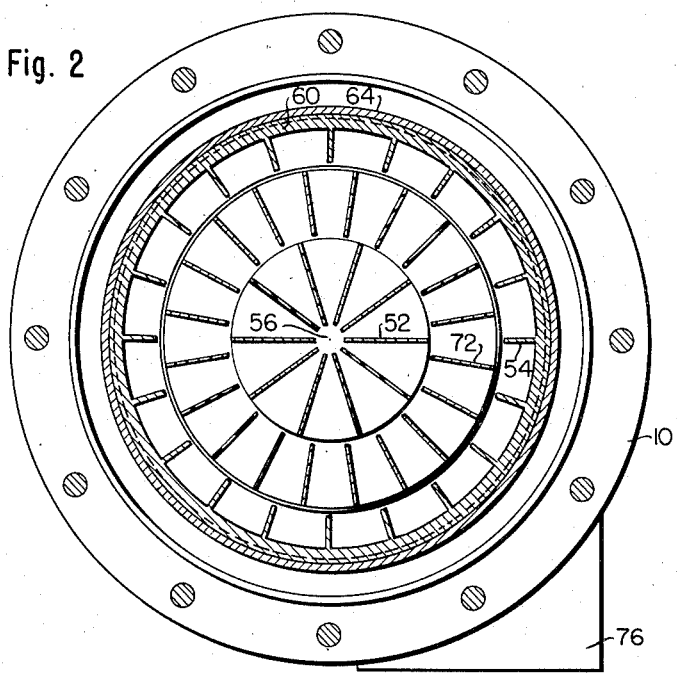
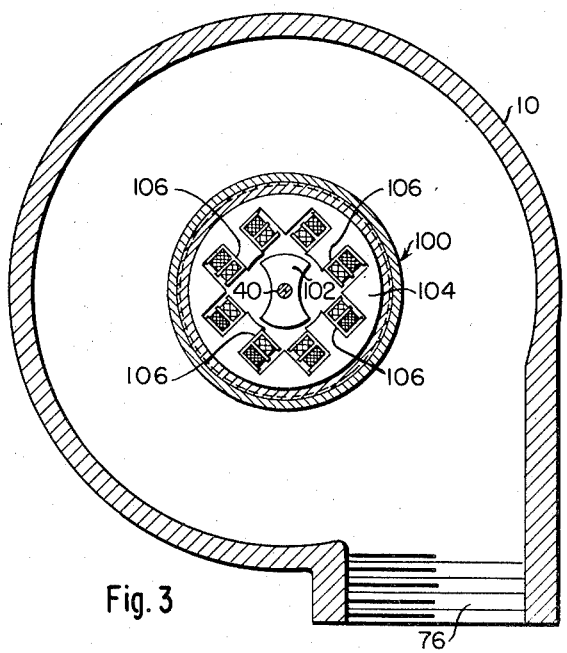
Fig. 3
INVENTOR.
ROBY B. WHITE
BY
Kenway, Jenney, Witter & Hildreth
ATTORNEYS United States Patent Office 2,832,218
Patented Apr. 29, 1958

2,832,218

CORIOLIS MASS FLOWMETER

Roby B. White, Sharon, Mass., assignor, by mesne assignments, to American Radiator & Standard Sanitary Corporation, New York, N. Y., a corporation of Delaware Application July 9, 1954, Serial No. 442,351

13 Claims. (Cl. 73—194)

The present invention relates to instruments for measuring the mass rate of flow of fluids and in particular to an improved flowmeter of the type in which mass flow rate is made responsive to Coriolis force, as shown, by way of example, in the copending application of Y. T. Li Ser. No. 308,572 filed September 9, 1952.

In instruments of the class described the fluid to be measured is subjected to tangential acceleration in a whirling tube, or impeller, the torque exerted on the tube in reaction to the Coriolis force of the accelerated fluid being measured as an indication of the mass flow rate.

The operative equation is:

$$M = W\omega(r_2^2 - r_1^2)$$

where $M$ = net moment about the axis of rotation, due to Coriolis force
$W$ = mass rate of flow
$\omega$ = angular velocity
$r_1$ = radius at inlet of accelerating impeller or tube
$r_2$ = radius at outlet of accelerating impeller or tube It is obvious that the torque output is dependent upon the product of $W$ and $\omega$ and is also dependent upon the physical dimensions of the unit. In cases where $r_2$ can be made very large with respect to $r_1$, small changes in $r_1$ will not be important. However, in those cases where because of physical limitations of size this is not possible, it is desirable accurately to fix $r_1$ by some mechanical means.

The principal object of the present invention is to eliminate errors of measurement in a Coriolis type of flowmeter.

Another object of the invention is to provide an accurate means of measuring mass flow of fluids.

Still another object of the invention is to provide a mass flowmeter capable of incorporation in a small, light form suitable for use in places where size and weight are of prime importance.

An important feature of the invention resides in the combination of a principal impeller having spaced annular rows of vanes, a secondary impeller having one annular row of vanes disposed between the two rows of the principal impeller and driven through an elastic connection to the principal impeller, the result being that the principal impeller forces the fluid into rotation before it encounters the secondary impeller and also discharges the fluid into the secondary impeller. Since the interfaces between the two impellers are of fixed dimension, $r_1$ and $r_2$ are also fixed. Moreover the shear upon the fluid introduced by changing its axial progress through an inlet pipe into the spiral path through the impellers is absorbed by the principal impeller and not permitted to influence the reaction of the secondary impeller; thus another source of error is eliminated.

Another feature of the invention resides in the combination of a torsion spring drive for the secondary impeller which carries the armature of a variable dynamo transformer. The armature departs from neutral position in proportion to the angular displacement of the two impellers and thus in turn is responsive to the Coriolis force being measured. Consequently there is provided a simple and accurate means for producing a signal responsive to mass flow of fluid through the instrument.

These and other objects and features of the invention will best be understood and appreciated from the following detailed description of a preferred embodiment thereof, selected for purposes of illustration and shown in the accompanying drawings, in which:

Fig. 1 is a longitudinal cross-section through a mass flowmeter constructed in accordance with this invention, Fig. 2 is a cross-section taken along the section line 2—2 of Fig. 1, and Fig. 3 is a cross-section taken along the section lines 3—3 of Fig. 1.

At the outset a brief recitation of the arrangement of the major elements within their housing will be offered to aid in presenting a clear description of this invention. Inspection of Fig. 1 reveals that the apparatus is organized within an enclosure defined by a cylindrical center casing 10 and end pieces 12 and 14. A wall or partition 16 integrally cast with the center casing divides the enclosure into three chambers 17, 18 and 19. The largest of the three chambers (chamber 17) houses a pair of coaxially disposed impellers 50 and 70 and a dynamo transformer 100, which may be of the type disclosed in the patent to Mueller, No. 2,488,734 issued November 22, 1949, while the chambers 18 and 19 respectively contain a motor 20 for driving the impellers and an instantaneous speed indicator in the form of a drag cup generator 120. All of the recited elements will be described in greater detail below.

Referring now to the drive mechanism for the impellers 50 and 70, the shaft 22 of the motor 20 extends across the chamber 18 between the end piece 12 and the wall 16 and is fixed in position by bearings 24 and 25. Carried by the motor shaft 22 is a pinion 26 which meshes with a gear 28 to drive a second gear 30 mounted on a stub shaft 32. The stub shaft 32 which extends into the chamber 19 is mounted on the end piece 12 by means of shaft bearings 34. Abutting the free end of the stub shaft 32 and secured to the hub of the gear 30 is a hollow tubular shaft 36 which extends across the chamber 19 into an opening 37 in the wall 16.

Continuing with the description of the driving mechanism, the tubular shaft 36 is integrally formed with a cup 46 which houses the dynamo transformer 100 to be described in detail below. The cup 46 also serves as a part of the shaft structure to drive the principal impeller. A cover for the dynamo transformer is provided in the form of a cup 48 having a threaded section which registers with a similar section on the rim of the cup 46. The cup 48 in turn is integrally formed and smoothly merges with a portion of the principal impeller.

The principal impeller 50 comprises two major coaxial portions 60 and 64 which form an enclosure herein termed the impeller chamber. The portions 60 and 64 are screwed together at their peripheries, the portion 60 terminating in an enlarged inlet pipe 58 leading to the interior of the impeller chamber. An internally threaded inlet 74 in the end piece 14 registers with the pipe 58.

The pipe 58 is journaled in bearings 62 carried in the end piece 14. An annular disc 78, fixed to the end piece 14 by screws 80, retains the bearing 62 in position. A ring 82 rotates with the portion 58 and is spring urged against the disc to form a fluid seal about the impeller chamber opening. All of the fluid must necessarily pass through the impellers 50 and 70 which serve as the immediate flow responsive elements, if the measurement of mass flow is to be accurate; hence the need for the fluid seal.

Proceeding to a detailed description of the components of the principal impeller 50, its hub 56 of streamlined configuration faces the inlet 74, while a plurality of radially disposed vanes 52 are secured between the hub and the inlet pipe 58. The hub 56 and the vanes 52 will direct radially outward all of the fluid which enters the impeller chamber. The fluid directed by the hub 56 and vanes 52 will subsequently impinge upon a second annular row of vanes 54 forming the outer vanes of the principal impeller and positioned at the radial extremity of the impeller chamber. After the fluid leaves the vanes 54, the shroud 64 and its radial vanes 68 will guide the fluid radially inward and then out of the impeller chamber into the chamber 17 formed by casing 10. To separate and define the radially outward and radially inward fluid paths, a plate 66 is positioned perpendicular to the axis of the impeller, and is integrally formed with the shroud 64, vanes 68 and a hollow shaft 69 integrally cast with the covering cup 48 of the dynamo transformer.

To set forth more clearly the mechanical means provided to drive the principal impeller 50, the elements interconnecting it with the motor 20 will be retraced. Starting at the power source, rotation of the motor shaft 22 will cause the pinion 26 to drive the gears 28 and 30. The tubular shaft 36 mounted on the hub of gear 30 will rotate the cup 46 and the covering cup 48. The shaft 69 integrally formed with the cover 48 will in turn drive the sections 60 and 64, at the same time rotating the inner and outer annular rows of vanes 52 and 54 and the decelerating vanes 68.

Proceeding now to a description of the heart of the flow sensing device, as best illustrated in Fig. 2, a secondary impeller 70 positioned within the impeller chamber has a disc 88 carrying a single annular row of vanes 72 whose inner and outer edges extend radially to the outer and inner edges of the principal impeller vanes 52 and 54 respectively. A conical hood or shroud 86 is mounted on the outer edges of the vanes 72. Fluid leaving the vanes 52 will impinge upon the vanes 72 out of contact with the principal impeller, since it is confined between the disc 88 and hood 86.

A torsion spring 38 connected at one end to the hub of the gear 30 and tubular shaft 36 is provided to drive the secondary impeller 70. The spring 38 extends through the cavity in the center of the tubular shaft 36 and the opening 37 in the wall 16 into the dynamo transformer chamber where it is connected at its other end with the secondary impeller shaft 40 extending through the hollow shaft 69 and secured at its forward end to the hub 90 of the secondary impeller cast in the center of the disc 88. To align the shaft 40 axially in the hollow shaft 69 and to permit relative rotation of the collar and the shaft, bearings 42 and 44 are provided at each end of the secondary impeller shaft, in the cover 48 and hub 56 respectively.

Following the above detailed description of the mechanical components of the flowmeter is an explanation of their operation. The inlet 74 is connected in the line of the fluid whose mass flow rate or total flow is to be measured. The motor 20 is energized, imparting rotary motion to the principal impeller 50 through the mechanical drive mechanism described above. Fluid entering axially into the impeller chamber will be caught up in the rotating inner row of vanes 52 and will be driven radially outward by the vanes with the aid of the hub 56. As the radially moving fluid passes over the outer edges of vanes 52, it will encounter the vanes 72 of the secondary impeller. A torque will be exerted by the secondary impeller in reaction to the Coriolis force of the accelerating fluid moving across its vanes.

It will be seen that the fluid as it passes across the inner vanes 52 is accelerated tangentially, and the conversion from axial conduit flow to radial flow causes a shearing effect upon the inner blades. As the fluid leaves the vanes 52 having a rigid driving connection to the motor, it moves into contact with the vanes 72 having a yieldable driving connection to the motor through the torsion spring 38. The shearing force will be totally absorbed by the principal impeller, and the fluid directed against the vanes 72 of the secondary impeller will exert a torque thereon in reaction only to the Coriolis force. The flexible drive connection 38 permits a phase shift of the secondary impeller with respect to the principal impeller under the influence of that torque.

Before completing the description of the fluid path as it travels through the impeller chamber, a closer inspection of the shearing forces and their adverse effects upon measurements of mass flow is deemed necessary for a full appreciation of this invention. As is clearly illustrated in Figs. 1 and 2 the outer edges of the inner blades 52 terminate a radial distance from the axis of rotation substantially equal to the distance of the inner edge of blade 72 from said axis. If in fact there were a substantial radial separation of outer and inner edges of the blades 52 and 72 respectively, the edges of the blades would of necessity have to cut the fluid suspended between these edges. Additional displacement of the secondary impeller would result under the influence of these forces which, as is demonstrated by the working equation set forth in the introductory paragraphs, have no relationship to mass flow rate. An error so introduced would be compounded by a substantial radial separation of the outer edge of the blades 72 and the inner edge of blades 54. Not only does the close radial proximity of the edges of the blades eliminate the adverse effects of shearing forces, but as will be more fully explained below, it establishes well defined $r_1$ and $r_2$ distances which are absolutely necessary to obtain highly accurate mass flow measurements.

Following the fluid path beyond the vanes 72, the fluid will next encounter the outermost vanes 54 which are driven at the same speed as the inner blades 52. The blades 54 with the aid of the periphery of the impeller casing will turn the fluid so that flow is parallel to the axis of rotation. The vanes 68 will then carry the fluid radially inward and tangential deceleration will take place as the fluid is moved toward the axis. To prevent the flowmeter from acting as pump, the vanes 68 are provided to recover energy which the fluid gains as it passes radially outward from the axis over blades 52, 72 and 54. The energy recovered by the vanes 68 as the fluid returns to the axis helps the motor 20 drive the mechanism, thereby adding energy to the fluid on the inlet side of the impeller chamber. Subsequently the fluid leaves the impeller casing through its opening 65 and is free to pass through the chamber 17 and the outlet 76 back to its conduit (not shown).

Referring to the operative equation set forth in the introduction of this specification, the radius $r_1$ may be seen to be the distance from the axis of rotation of the impellers to the interface of blades 52 and 72, while radius $r_2$ is the distance from the interface of blades 72 and 54 to the axis of rotation. Because the blades 52 and 54 are integrally connected by the impeller casing wall 60, their relative positions are fixed with respect to the axis of rotation and therefore $r_1$ and $r_2$ are constant.

Maintenance of $r_1$ and $r_2$ fixed and determinable is of primary importance. In essence, there must be some means of determining the precise area over which the flowing fluid exerts a Coriolis force against the secondary impeller. If there is not a distinct line of demarcation between the particles of fluid that do and do not exert such a force, obviously such force cannot accurately be measured, nor is it possible to determine the net moment about the axis of rotation caused by this force. It is apparent from an inspection of Figs. 1 and 2 that at any given instant the particles of fluid which lie beyond the edges of the blade 72 are prevented from exerting a Coriolis force against the secondary impeller by virtue of the fact that they are contained either by the blades 52 or 54 of the principal impeller. If, however, these particles of fluid in the fluid column were not contained by the blades 52 and 54, but instead were substantially uncontrolled by walls or vanes, then, although they did not lie within a radial distance from the axis of rotation defined by the vanes 72, they would exert some Coriolis force against the secondary impeller. That is the case when an appreciable radial separation exists between the outer and inner edges of blades 52 and 54 respectively and the edges of the secondary impeller vanes 72. Obviously measurement may not be made of the physical limits of the column of fluid exerting such a force nor is the full Coriolis force exerted by the particles beyond the vanes 72 exerted against the secondary impeller. As a result, a flowmeter having an appreciable radial separation between the principal and secondary or sensing impeller not only is inaccurate due to the presence of shearing forces, as explained in detail above, but is further inaccurate because $r_1$ and $r_2$ are not fixed and determinable.

In the electrical system of the invention there is a dynamo transformer 100 illustrated in Fig. 3 and of the type disclosed in the above-mentioned patent issued to Mueller. The device is arranged to render a variable output voltage in accordance with the position of the rotor, i. e. proportional to the rotor displacement. As the net moment or torque about the axis of rotation of the impeller 72 is proportional to $W\omega$, it will be seen that if the displacement of the rotor is proportional to the torque, then the output voltage will be directly proportional to $W\omega$. That is the case here.

In detail, the rotor 102 of the transformer 100 is mounted on and rotates with the shaft 40 of the secondary impeller, while the stator 104 and its pole pieces 108 are fixed to the transformer housing cup 48 and rotate with the primary impeller. The coils 106 of the transformer are wound about the pole pieces and rotate therewith while the rotor is free of electrical coils.

The rotor 102 is initially assembled in its neutral position and will, in the absence of fluid flow over the vanes 72 of the secondary impeller, remain in that position for there will be no forces acting on the secondary impeller vanes. However, when fluid is passed through the housing, the torque exerted against the blades 72 which displaces the secondary impeller with respect to the principal impeller will also angularly displace the rotor 102 an equal amount with respect to the pole pieces 108. The displacement of the rotor will affect the output voltage in the coils.

Because dynamo transformers of the class illustrated render linear output signals through but small angular displacements of the rotor, the torsion spring 38 is designed to limit displacement of the secondary impeller to one or two degrees under maximum flow conditions. Limited displacement of the secondary impeller serves another very useful purpose, namely, turbulence is reduced to a minimum as the fluid to be measured moves radially outward from the axis of rotation. If relatively large displacements of the rotor were permitted, correspondingly large displacements would occur with small changes in flow rate. The turbulence thus created would adversely effect the accuracy of the meter.

If the motor 20 drives the impeller at a constant speed, the output voltage of the transformer 100 may be employed to render mass flow measurements in slugs per second by specially calibrating the scale of a standard A. C. voltmeter. If, however, it is desired to obtain mass flow reading in slugs or total flow readings in pounds, the mass flow rate reading must be integrated with respect to time. Because the use of a synchronous motor to drive the impellers at a constant speed makes the accuracy of the flowmeter dependent upon frequency, the need for rotating the impellers at a constant speed has here been eliminated. Although a motor has been illustrated as the driving means, by virtue of the apparatus presently to be described, an air turbine, D. C. motor, a gas engine, etc. could be employed to drive the principal and secondary impeller.

A drag cup generator of conventional construction is mounted in the chamber 19 on the shaft 36 to measure $\omega$, the angular velocity of the impellers. In detail, the drag cup generator or tachometer 120 is mounted with its armature 124 immediately surrounding the shaft 36 but secured against rotation by a bracket 126 mounted on the partition 16. Surrounding the armature but radially spaced therefrom is the stator 122 carrying the generator coils 130. A metallic cup 128 having its cylindrical portion disposed between the armature and stator is secured to and rotates with the shaft 36. This results in the cutting of flux lines by cup 128 and the setting up of eddy currents. The operation of such a device is well known in the art and therefore it is deemed unnecessary to recite in greater detail the manner in which it operates. It is sufficient to note that the output voltage of the generator is proportional to the angular velocity of the shaft.

The electrical connections to the transformer 100 may be made by means of the slip rings 121 mounted on the shaft 36 in the chamber 19. No need exists for employing slip ring connectors for the generator 120 because its stator is fixed with respect to the casing.

Having thus described a transformer 100 which renders an output voltage proportional to the moment exerted about the axis of rotation, and having described a second electrical sensing device 120 having an output voltage proportional to $\omega$, it is apparent that merely by dividing M (the moment) by $\omega$ (the angular velocity) the mass flow rate may be obtained, for $r_1$ and $r_2$ are known constants. To determine the mass flow in slugs or total flow in pounds, the mass flow rate obtained by the division of M by $\omega$ must be integrated with respect to time. The method employed to perform the mathematical computations forms no part of this invention, and therefore has not been illustrated or described.

It is believed that a man skilled in the art could readily devise automatic means for performing the necessary computations. The Moore Patent No. 2,472,609 issued June 7, 1949, discloses one electrical circuit which may be employed to perform the necessary mathematical calculations.

Although throughout the description of the embodiment of this invention illustrated in the drawings the fluid flow through the impellers has been described as being directed radially outward over the vanes 52, 72, and 70, it is to be understood that the direction of flow may be reversed without limiting the ability of the apparatus to effect mass flow measurements. The port 76 in casing 10 may be connected into the fluid line and serve as an inlet for the meter. The fluid may subsequently enter the impeller chamber through opening 65, flow radially outward over the vanes 68 and radially inward over vanes 54, 72, and 70. This flow direction is particularly desirable when a mixture containing vapor is flowing through the meter, for the velocity head of the fluid flowing over the sensing vanes 72 and the centrifugal force upon the air will be exerted in the same direction, thus preventing the accumulation of an air bubble in the sensing impeller 70.

From the foregoing description it will be appreciated that basically it is only necessary to have fixed determinable radii between which the fluid is tangentially accelerated when the means for imparting said accelerations rotate at a determinable velocity. Obviously, this knowledge will suggest other embodiments of the invention disclosed herein. Therefore, it is not intended that the scope of this invention be limited to the specifically

What I claim as new and desire to secure by Letters Patent of the United States is:

1. A flowmeter comprising a casing having inlet and outlet ports, first means rotatably mounted in said casing for tangentially accelerating fluid passing through said casing, a second means mounted for rotation about the axis of rotation of said first means radially contiguous to said first means and responsive to the effect of the tangentially accelerating fluid, drive means coupled to said first means, flexible means operatively connected between said first and second means to drive said last-named means with said first means, electrical means responsive to an angular displacement of said second means with respect to said first means for producing an output voltage as a function of the mass flow rate of said fluid and the angular velocity of said first means, and second electrical means mounted on said drive means for producing an output voltage proportional to the angular velocity of said first means.

2. Apparatus of the class described comprising rotatably mounted impelling means for tangentially accelerating fluid, means for introducing fluid to be measured to said impelling means, a second means mounted for rotation coaxially with and radially contiguous to said impelling means and responsive to the effect of the tangentially accelerating fluid, driving means coupled to said impelling means, means flexibly connecting said second means to said impelling means to drive said second means with said impelling means, and electrical means connected to said flexible connecting means and said drive means for producing a signal proportional to a torque exerted by said second means on said fluid in reaction to the Coriolis force exerted by said fluid on said second means.

3. A flowmeter comprising a casing, means for directing fluid to be measured in and out of said casing, a principal impeller in said casing having a pair of radially spaced apart annular rows of radial vanes, said inner row of radial vanes being in the path of all the fluid introduced into said chamber for tangentially accelerating all of said fluid, a second impeller having a single annular row of radial vanes spaced radially between the rows of radial vanes of the principal impeller, first driving means including a hollow shaft connected to rotate said principal impeller, flexible driving means positioned within said hollow shaft and connected to said first driving means to drive said second impeller with the principal impeller, and torque measuring means including an armature mounted on said flexible driving means responsive to the torque exerted on the fluid in reaction to the Coriolis force exerted by said fluid on said second impeller for rendering an output signal as a function of the angular velocity of said principal impeller and the mass flow rate of said fluid.

4. A flowmeter as defined in claim 3 further characterized by a means connected to and rotating with said drive means for producing an output signal proportional to the angular velocity of said principal impeller.

5. A flowmeter as defined in claim 3 wherein said flexible driving means limits said second impeller to a maximum angular displacement of three degrees with respect to said principal impeller with maximum flow conditions.

6. Apparatus of the class described comprising means defining a flow path for fluid, angularly moving means in said path for imparting a tangential acceleration to the fluid moving in said path, torque responsive means in said path having walls radially displaced from said angularly moving means further tangentially accelerating fluid accelerated by said angularly moving means, second angularly moving means fixed to and angularly moving with said first-named angularly moving means having walls radially displaced from said torque responsive means for further tangentially accelerating fluid leaving said torque responsive means, flexible drive means connected to said first-named angularly moving means and to said torque responsive means for driving said torque responsive means in the same direction as the angularly moving means, and means responsive to the relative angular displacement of said torque responsive means and each of said angularly moving means.

7. Apparatus of the class described comprising means defining a flow path for fluid, angularly moving means in said path for imparting a tangential acceleration to the fluid moving in said path, torque responsive means in said path having walls radially displaced from said angularly moving means further tangentially accelerating fluid accelerated by said angularly moving means, second angularly moving means fixed to and angularly moving with said first-named angularly moving means having walls radially displaced from said torque responsive means for further tangentially accelerating fluid leaving said torque responsive means, flexible drive means connected to said first-named angularly moving means and to said torque responsive means for driving said torque responsive means in the same direction as the angularly moving means, and torque measuring means responsive to the relative angular displacement of said torque responsive means and each of said angularly moving means caused by the Coriolis force applied to said torque responsive means for rendering a signal a function of the mass flow rate of the fluid.

8. Apparatus as defined in claim 7 further characterized by an electrical means responsive to the angular movement of said angularly moving means for rendering an output signal proportional to the angular velocity of said means.

9. In a mass flowmeter having angularly movable sensing means for tangentially accelerating fluid whose mass flow rate is to be measured; second and third means mounted coaxially with and radially inwardly and outwardly from said sensing means defining therewith a continuous substantially radial path for fluid passing through said sensing means, partially flexible drive means connected to said second means, said third means and said sensing means for simultaneously angularly moving said second and said third means and said sensing means in the same angular direction, and flow rate indicating means responsive to the relative angular displacement of said sensing means and said second and said third means.

10. A flowmeter comprising a pair of telescopically disposed annular impellers, the inner periphery of the outer impeller being substantially contiguous to the outer periphery of the inner impeller, means for directing fluid to be measured through said impellers, partially flexible drive means connected to said impellers for simultaneously angularly moving said impellers, and flow rate indicating means responsive to the relative angular displacement of said impellers.

11. A flowmeter comprising a principal impeller having a pair of radially spaced apart annular rows of radial vanes, means for rotating said impeller, a second impeller having an annular row of radial vanes telescopically disposed between the rows of vanes of said principal impeller, the inner and outer periphery of the outer and inner rows of vanes of the principal impeller being substantially contiguous to the outer and inner periphery of the annular row of vanes respectively of the second impeller, flexible drive means for said second impeller connected to said means for rotating said principal impeller rotating said second impeller with said principal impeller, and flow rate indicating means responsive to the relative angular displacement of said second and principal impellers.

12. A flowmeter comprising a housing, a principal impeller within said housing having a pair of radially spaced apart annular rows of radial vanes, rotating means connected to said impeller, means for guiding fluid to be measured into said impeller along its axis of rotation, a second impeller coaxially mounted with said principal impeller and having an annular row of radial vanes positioned radially between the annular rows of vanes of said principal impeller, a flexible drive shaft connected between said second impeller and said rotating means and adapted to maintain said second impeller in a fixed position relative to the principal impeller when a constant rate of fluid flow is maintained through said impeller, said shaft permitting angular displacement of said second impeller with respect to the principal impeller under unsteady rates of fluid flow therethrough, and torque measuring means having an armature mounted on said flexible shaft for measuring the torque exerted by said fluid on said second impeller.

13. A flowmeter comprising a casing having inlet and outlet ports, a first rotor mounted for rotation in said casing and having two radially spaced annular rows of radial vanes for tangentially accelerating fluid passing through said casing, driving means connected to said first rotor, a second vaned rotor mounted coaxially with said first rotor and having an annular row of radial vanes disposed between the annular rows of said first rotor for tangentially accelerating fluid passing through said casing, a flexible drive connecting said driving means to said second rotor to drive the latter with said first rotor, said flexible drive permitting a maximum angular displacement of said second rotor with respect to said first rotor of the order of a few degrees in reaction to the Coriolis force of the fluid being measured under maximum flow conditions, and means including an armature connected to said flexible drive and mounted for rotation therewith, said last named means rendering a signal in response to torque exerted on said second rotor, said signal being a function of the mass flow rate of fluid passing through said casing.

References Cited in the file of this patent

UNITED STATES PATENTS

| | | |
|---|---|---|
| 2,472,609 | Moore | June 7, 1949 |
| 2,602,330 | Kollsman | July 8, 1952 |

OTHER REFERENCES

Mass-flow-rate Indicator pub. in "Instruments," p. 348, of vol. 26, March 1953.

A Fast Response True-Mass-Rate Flowmeter by Li and Lee, ASME, Transactions, pp. 835–841, July 1953.